US012625471B2

(12) United States Patent
Riedo et al.

(10) Patent No.: US 12,625,471 B2
(45) Date of Patent: May 12, 2026

(54) LEAP-YEAR DISPLAY MECHANISM FOR A HOROLOGICAL MOVEMENT WITH A PERPETUAL CALENDAR DISPLAY

(71) Applicant: Montres Breguet S.A., L'Abbaye (CH)

(72) Inventors: Christophe Riedo, Le Lieu (CH); Jean-Philippe Rochat, Les Bioux (CH)

(73) Assignee: Montres Breguet S.A., L'Abbaye (CH)

( * ) Notice: Subject to any disclaimer, the term of this patent is extended or adjusted under 35 U.S.C. 154(b) by 277 days.

(21) Appl. No.: 18/494,875

(22) Filed: Oct. 26, 2023

(65) Prior Publication Data

US 2024/0152096 A1 May 9, 2024

(30) Foreign Application Priority Data

Nov. 9, 2022 (EP) ..................................... 22206485

(51) Int. Cl.
*G04B 19/257* (2006.01)

(52) U.S. Cl.
CPC ................................ *G04B 19/2573* (2013.01)

(58) Field of Classification Search
CPC .......... G04B 19/2573; G04B 19/25333; G04B 19/2576; G04B 19/2536; G04B 19/2575; G04B 19/241; G04B 19/2532; G04B 19/23; G04B 19/24; G04B 19/243; G04C 17/0066
See application file for complete search history.

(56) References Cited

U.S. PATENT DOCUMENTS 4,541,725 A 9/1985 Baumgartner et al.
5,184,333 A 2/1993 Caspar
7,706,214 B2 * 4/2010 Scheufele .......... G04B 19/2536 368/37
8,842,500 B2 * 9/2014 Schmidt ............... G04B 19/253 368/37
2003/0198139 A1 10/2003 Kitahara et al.
2016/0187854 A1 6/2016 Goeller
2020/0183331 A1 * 6/2020 Matteazzi ............ G04B 19/247

FOREIGN PATENT DOCUMENTS

EP 0 135 823 A1 4/1985
EP 1 341 063 A2 9/2003
EP 3 040 787 A1 7/2016
JP 2003-255063 A 9/2003
JP 2016-126008 A 7/2016

OTHER PUBLICATIONS

European Search Report issued Mar. 20, 2023 in European Application 22206485.9 filed on Nov. 9, 2022 3 pages (with English Translation of Categories of Cited Documents).
Office Action issued Nov. 5, 2024, in corresponding Japanese Patent Application No. 2023-182534, 2 pages.

* cited by examiner

*Primary Examiner* — Edwin A. Leon
(74) *Attorney, Agent, or Firm* — Oblon, McClelland, Maier & Neustadt, L.L.P.

(57) ABSTRACT

A leap-year display mechanism for a horological movement with a perpetual calendar display including a drive element connected to a month wheel set rotated by one step per month, a transmission star intended to be attached to a structure of the horological movement, arranged along the stroke of the drive element so as to be rotated thereby when the month wheel set completes one full revolution, a leap-year display connected to the transmission star via a reduction gear train so that with each revolution of the month wheel set, the leap-year display is rotated by one step.

6 Claims, 3 Drawing Sheets

Cutting plane A-A

Cutting plane B-B

LEAP-YEAR DISPLAY MECHANISM FOR A HOROLOGICAL MOVEMENT WITH A PERPETUAL CALENDAR DISPLAY

CROSS-REFERENCE TO RELATED APPLICATION

This application claims priority to European Patent Application No. 22206485.9 filed on Nov. 9, 2022, the entire disclosure of which is hereby incorporated herein by reference.

TECHNICAL FIELD OF THE INVENTION

The invention relates to the horological field, and in particular to timepieces with a perpetual calendar display.

More particularly, the invention relates to a leap-year display mechanism for a horological movement with a perpetual calendar display.

TECHNOLOGICAL BACKGROUND

Perpetual calendar display mechanisms are well known horological complications allowing a date to be displayed, which perpetual calendar display mechanisms allow the date to be displayed by adapting automatically, i.e. without the need for manual intervention, to the length of the month, in particular while taking leap years into account.

In some timepieces, the perpetual calendar display mechanism is connected to a display indicating whether the current year is a leap year or a normal year.

These mechanisms are complex to produce and assemble. Moreover, they typically consume a lot of power.

SUMMARY OF THE INVENTION

The invention overcomes the aforementioned drawbacks by providing a solution for displaying leap years that is relatively simple in design and has minimal power consumption.

The mechanism according to the invention is particularly suitable for a roller display.

To this end, the present invention relates to a leap-year display mechanism for a horological movement with a perpetual calendar display comprising:

- a drive element connected to a month wheel set rotated by one step per month,
- a transmission star intended to be attached to a structure of the horological movement, arranged along the stroke of the drive element so as to be rotated thereby when the month wheel set completes one full revolution,
- a leap-year display connected to the transmission star via a reduction gear train so that with each revolution of the month wheel set, the leap-year display is rotated by one step.

In specific embodiments, the invention can further include one or more of the following features, which must be considered singly or according to any combination technically possible.

In specific embodiments, the drive element takes the form of a finger attached eccentrically to the month wheel set by a mechanical connection of the embedded type.

In specific embodiments, the transmission star has four teeth.

In specific embodiments, the leap-year display comprises indications representative of the current type of year, including a leap year and normal years.

In specific embodiments, the leap-year display takes the form of a roller comprising a display wall on which the indications representative of the current type of year are shown.

In specific embodiments, the leap-year display includes an annular bearing surface by which it is attached to the reduction gear train, said annular bearing surface being connected to the display wall by means of an end wall.

In specific embodiments, the leap-year display includes a mechanism for adjusting the angular position thereof, formed by a radial lug attached to the annular bearing surface, by means whereof said annular bearing surface is connected to the end wall, said radial lug comprising a threaded hole cooperating with a screw engaged in an oblong hole made in the end wall and extending in a curvilinear direction.

In specific embodiments, the reduction gear train includes a first wheel rigidly attached coaxially to the transmission star for rotation therewith and a second wheel rigidly attached coaxially to the leap-year display for rotation therewith.

In specific embodiments, the reduction gear train is configured such that one step of the leap-year display corresponds to one eighth of a revolution thereof.

BRIEF DESCRIPTION OF THE FIGURES

Other features and advantages of the invention will become apparent upon reading the following detailed description given by way of a non-limiting example, and with reference to the accompanying drawings, wherein.

It should be noted that the figures are not necessarily drawn to scale for clarity purposes.

DETAILED DESCRIPTION OF THE INVENTION

Figure 1:
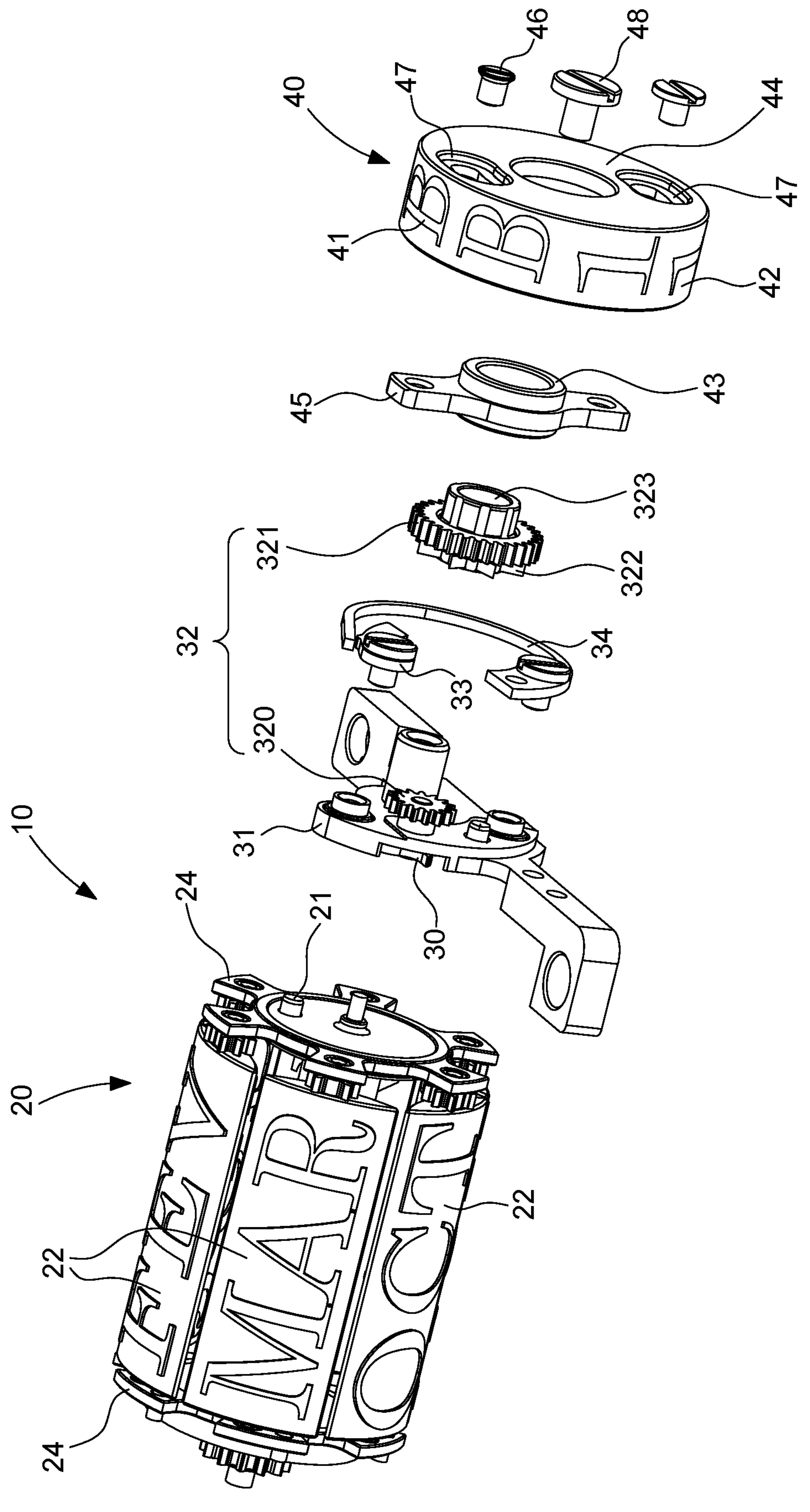
FIG. 1 shows a partially exploded, perspective view of a leap-year display mechanism of a horological movement with a perpetual calendar display according to a preferred example embodiment of the invention.

As can be seen in the exploded view in FIG. 1, the invention relates to a leap-year display mechanism 10 for a horological movement with a perpetual calendar display.

The leap-year display mechanism 10 comprises a month wheel set rotated by one step per month, to which a drive element 21 is connected. In the preferred embodiment of the invention, the drive element 21 advantageously takes the form of a finger, and is attached to the month wheel set 20 by a mechanical connection of the embedded type, i.e. without any degree of freedom.

The drive element 21 is advantageously attached eccentrically relative to the axis of rotation of the month wheel set 20, as shown in FIG. 1, and is intended to rotate a transmission star 30 by one step for each revolution made by the month wheel set 20. In particular, the transmission star 30 is intended to be attached so that it can rotate relative to a structure of the horological movement (not shown in the figures), such as a plate or a bridge, preferably by means of a support structure 31 shown in FIGS. 2 and 3.

The transmission star 30 is connected to a leap-year display 40 via a reduction gear train 32 such that, with each revolution of the month wheel set 20, the leap-year display 40 is rotated by one step.

In the example embodiment shown in the figures, the present invention is advantageously applied to a roller-type date display. Alternatively, it can be adapted to any type of date display without presenting any design difficulties for a person skilled in the art. In particular, the present invention can be adapted to a disc-type date display.

Figure 2:
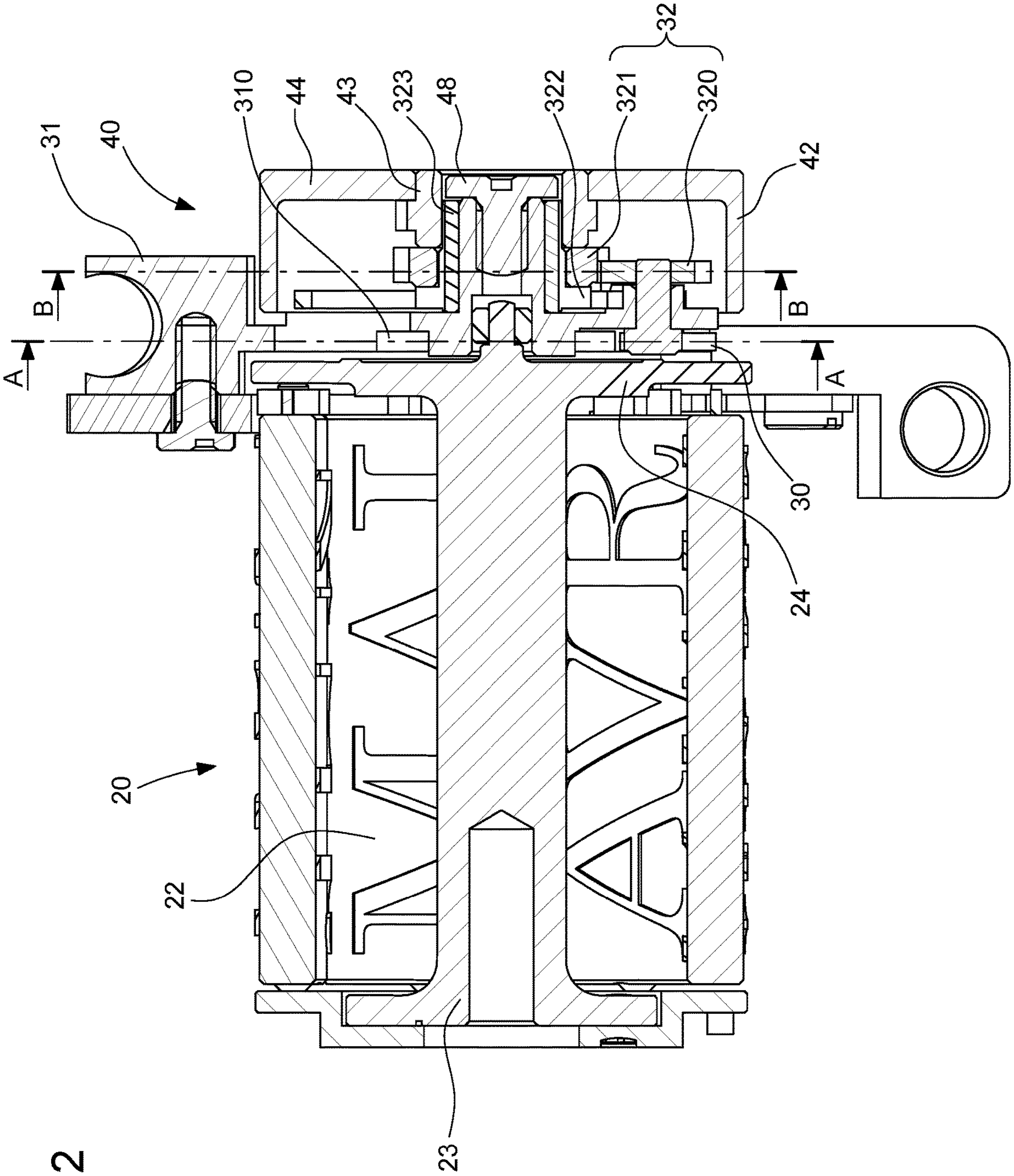
FIG. 2 shows a sectional view of a feature of the display mechanism in FIG. 1.
Figure 3:
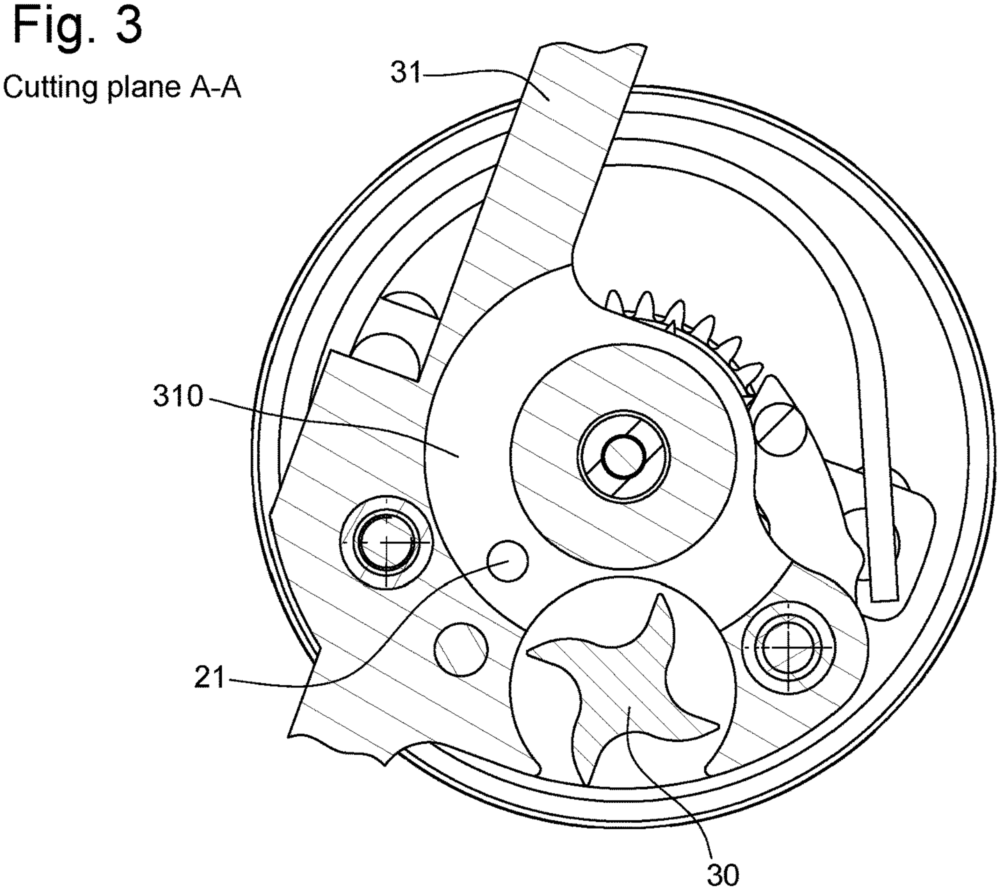
FIG. 3 shows a sectional view along the cutting plane A-A in FIG. 2.

As can be seen in FIGS. 1 and 2, the month wheel set 20 takes the form of a roller comprising a plurality of flaps 22 indicating the names of the months. These flaps 22 are arranged so as to be supported by a frame that is capable of rotating relative to the support structure 31 and, in the preferred example embodiment of the invention, are capable of rotating relative to said moving structure. In particular, the month wheel set 20 includes six flaps 22, each indicating two different months and being arranged so as to make a half-revolution for each complete revolution of the frame. The frame is rotated by a date mechanism that is known per se to a person skilled in the art so that it completes one full revolution in six months. Such a month wheel set 20 is described in more detail in the European patent EP3267266.

The frame is formed, for example, by an arbor 23, each end whereof is rigidly connected to a flange 24 for rotation therewith, as can be seen in the exploded view in FIG. 1 or in the sectional view in FIG. 2. In particular, each end of the arbor 23 is arranged so as to pivot within a support structure 31 intended to be attached to the structure of the horological movement. The drive element 21 is preferably attached to one of these flanges 24 so as to pivot about the longitudinal axis of the arbor 23 when the month wheel set 20 is rotating.

The support structure 31 can include a groove 310 extending in a circle, the centre whereof is aligned with the axis of rotation of the arbor 23 so that the drive element 21 can be housed inside said groove 310 throughout the stroke thereof. This feature allows the dimensions of the display mechanism according to the invention to be reduced.

Advantageously, as shown in FIG. 1, the reduction gear train 32 includes a first wheel 320 rigidly attached coaxially to the transmission star for rotation therewith, and a second wheel 321 rigidly attached coaxially to the leap-year display 40 for rotation therewith. As can be seen in the sectional view in FIG. 2, the second wheel 321 includes a tubular portion 323 with which it is rotatably arranged on the support structure 31. In the preferred example embodiment of the invention, the leap-year display 40 cooperates with the tubular portion 323 of the second wheel 321 in order to have a degree of rotational mobility relative to the support structure 31, as described in more detail hereinbelow.

Figure 4:
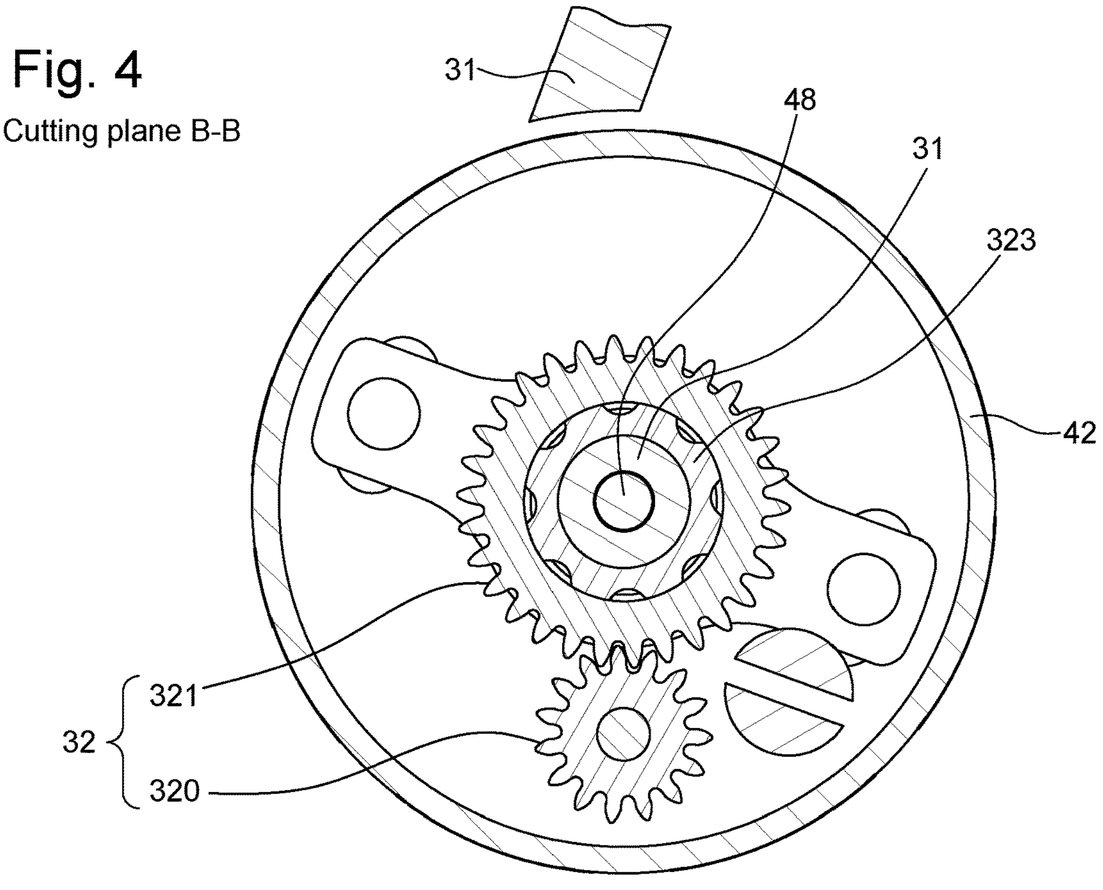
FIG. 4 shows a sectional view along the cutting plane B-B in FIG. 2.

As shown in FIGS. 1, 2 and 4, the reduction gear train 32 thus preferably includes only two wheels.

Moreover, the axes of rotation of the drive element 21, of the transmission star 30, of the first and second wheels 320 and 321 of the reduction gear train 32 and of the leap-year display 40 are parallel to one another.

Advantageously, the reduction gear train 32 can comprise a retaining star 322 rigidly connected to the second wheel 321 for rotation therewith, and configured to cooperate with a jumper 33 in order to keep the second wheel 321, and consequently the leap-year display 40, in a predefined discrete angular position.

Preferably, as shown in the exploded view in FIG. 1 and in the sectional view in FIG. 4, the jumper 33 is configured to be held in abutment against the retaining star 322 by a jumper spring 34.

Alternatively, the jumper 33 can itself be formed by a resilient strip and can be arranged in abutment against the retaining star 322 by deformation of said resilient strip. In such a case, the leap-year display mechanism 10 does not include a separate jumper spring.

In the preferred example embodiment of the invention, the reduction gear train 32 is configured such that one step of the leap-year display 40 corresponds to one eighth of a revolution. In particular, since the drive element 21 rotates the transmission star 30 through a quarter of a revolution, the reduction gear train 32 is dimensioned so as to generate a reduction ratio of one half, with the retaining star 322 comprising eight teeth. Since the month wheel set 20 makes two complete revolutions in one year, the leap-year display 40 is rotated at a rate of one complete revolution every four years.

The leap-year display 40 carries indications 41 representative of the current type of year, including a leap year and normal years. In particular, the indications 41 of the leap-year display 40 present a sequence of eight characters intended to become visible one after the other, at the rate of displaying two successive characters per year. In the preferred example embodiment, these characters are formed by the following sequence: 1, 1, 2, 2, 3, 3, B, B.

The indications 41 can be visible through a window made in an external part covering the leap-year display 40 (not shown in the figures).

Preferably, the leap-year display 40 takes the form of a roller comprising a cylindrical display wall 42 on which the indications 41 representative of the current type of year are shown. Moreover, the leap-year display 40 includes an annular bearing surface 43 by means whereof it is attached, without any degree of freedom, to the second wheel 321 of the reduction gear train 32, and in particular to the tubular portion 323, as shown in FIG. 2. More specifically, the annular bearing surface 43 can be driven into or bonded to the tubular portion 323. Advantageously, the latter can include flutes or any other element for stopping rotation, such as a key, etc. The annular bearing surface 43 is connected to the display wall 42 by means of an end wall 44, as shown in the example embodiment visible in FIG. 2.

Advantageously, the leap-year display 40 can include a mechanism for adjusting the angular position thereof. More specifically, as diagrammatically shown in FIG. 2, the adjustment mechanism can be formed by a radial lug 45 attached to the annular bearing surface 43, by means whereof said annular bearing surface 43 is connected to the end wall 44 and thus to the display wall 42. In particular, the radial lug 45 comprises a threaded hole which is intended to cooperate with a screw 46 engaged in an oblong hole 47 extending in a curvilinear direction made in the end wall 44. The curvilinear direction is defined by an arc of a circle, the centre whereof is aligned with the axis of rotation of the leap-year display 40.

Thus, when the screw 46 is loosened, the display wall 42 can move relative to the annular bearing surface 43, which motion corresponds to an angular displacement defined by the travel of the screw 46 between the two ends of the oblong hole 47. When the screw 46 is tightened, the leap-year display 40 is held in position.

Several adjustment mechanisms corresponding to that described hereinabove can be envisaged, i.e. a plurality of radial lugs 45, screws 46 and oblong holes 47, as shown in FIG. 1.

Advantageously, the annular bearing surface 43, and thus the second wheel 321 and the leap-year display 40, is prevented from moving in translation relative to the support structure 31 by means of a central screw 48 intended to cooperate with a threading made in said support structure 31. In particular, as can be seen in the sectional view in FIG. 2, the tubular portion 323 is inserted between two axial bankings formed by a screw head of the central screw 48 and by the support structure 31, thus eliminating any translational mobility of the second wheel 321 and of the leap-year display 40.

Generally speaking, it should be noted that the implementations and embodiments considered hereinabove have been described by way of non-limiting examples, and that other alternative implementations and embodiments can thus be envisaged.

The invention claimed is:

1. A leap-year display mechanism for a horological movement with a perpetual calendar display, wherein the display mechanism comprises:

a drive element connected to a month wheel set rotated by one step per month;

a transmission star configured to be attached to a structure of the horological movement, arranged along the stroke of the drive element so as to be rotated thereby when the month wheel set completes one full revolution;

a leap-year display connected to the transmission star via a reduction gear train so that with each revolution of the month wheel set, the leap-year display is rotated by one step, wherein the leap-year display includes a roller comprising a display wall on which indications representative of the current type of year are shown, including a leap year and normal years, wherein the drive element comprises a finger attached eccentrically to the month wheel set by a mechanical connection, and wherein the drive element projects from a side face of the month wheel set in a direction along a longitudinal axis of the month wheel set and in a direction of the leap-year display.

2. The display mechanism according to claim 1, wherein the transmission star has four teeth.

3. The display mechanism according to claim 1, wherein the leap-year display comprises an annular bearing surface by which the leap-year display is attached to the reduction gear train, said annular bearing surface being connected to the display wall with an end wall.

4. The display mechanism according to claim 3, wherein the leap-year display comprises a mechanism for adjusting the angular position thereof, formed by a radial lug attached to the annular bearing surface, via which said annular bearing surface is connected to the end wall, said radial lug comprising a threaded hole cooperating with a screw engaged in an oblong hole made in the end wall and extending in a curvilinear direction.

5. The display mechanism according to claim 1, wherein the reduction gear train comprises a first wheel rigidly attached coaxially to the transmission star for rotation therewith, and a second wheel rigidly attached coaxially to the leap-year display for rotation therewith.

6. The display mechanism according to claim 1, wherein the reduction gear train is configured such that one step of the leap-year display corresponds to one eighth of a revolution.

* * * * *